US010781415B2

(12) United States Patent
McKale

(10) Patent No.: US 10,781,415 B2
(45) Date of Patent: Sep. 22, 2020

(54) DEVICE FOR CAPPING A BARREL

(71) Applicant: Mark Joseph McKale, Tecumseh (CA)

(72) Inventor: Mark Joseph McKale, Tecumseh (CA)

(73) Assignee: INNOVATIVE DISTILLING TECHNOLOGIES, INC., Tecumseh, Ontario (CA)

( * ) Notice: Subject to any disclaimer, the term of this patent is extended or adjusted under 35 U.S.C. 154(b) by 574 days.

(21) Appl. No.: 15/147,025

(22) Filed: May 5, 2016

(65) Prior Publication Data

US 2016/0326474 A1 Nov. 10, 2016

Related U.S. Application Data

(60) Provisional application No. 62/157,614, filed on May 6, 2015.

(51) Int. Cl.
*C12H 1/22* (2006.01)
*B65D 51/24* (2006.01)
(Continued)

(52) U.S. Cl.
CPC ............ *C12H 1/22* (2013.01); *B65D 9/04* (2013.01); *B65D 21/0217* (2013.01);
(Continued)

(58) Field of Classification Search
CPC ............ B65D 9/04; B65D 21/0217; B65D 2543/00037; B65D 2543/00092; B65D 2543/00277; B65D 2543/00296; B65D 2543/00305; B65D 2543/00527; B65D 2543/00537; B65D 2543/00629; B65D 2543/00685; B65D 2543/0074; B65D 2543/00814; B65D 2543/00842;
(Continued)

(56) References Cited

U.S. PATENT DOCUMENTS

| 39,274 A | 7/1863 | Connolly |
|---|---|---|
| 116,398 A | 6/1871 | Barsaloux |

(Continued)

FOREIGN PATENT DOCUMENTS

| DE | 2226217 | 12/1973 |
|---|---|---|
| DE | 29800062 | 3/1998 |

(Continued)

OTHER PUBLICATIONS

"United Kingdom Application No. GB1607896.6, Search Report dated Nov. 22, 2016", (Nov. 22, 2016), 4 pgs.

*Primary Examiner* — Dana Ross
*Assistant Examiner* — Joe E Mills, Jr.
(74) *Attorney, Agent, or Firm* — Taft Stettinius & Hollister LLP; William Michael Etienne

(57) ABSTRACT

A capped barrel system includes a barrel for aging and a device for capping the barrel. The barrel includes a plurality of staves made of a wood suitable for aging liquids, a plurality of hoops for holding the staves together, a head having a flat circular top, a bunghole in the head, and a chime formed by raised ends of the staves. The device includes a lid sized to span across the head and beyond the chime, a flange extending downwardly from the lid for engaging an external side of the staves, an opening in the lid to generally align with the bunghole, and a closure sized to seal the opening.

20 Claims, 8 Drawing Sheets

(51) Int. Cl.
*B65D 21/02* (2006.01)
*B65D 39/00* (2006.01)
*B65D 8/00* (2006.01)

(52) U.S. Cl.
CPC ....... *B65D 39/0041* (2013.01); *B65D 51/245* (2013.01); *B65D 2543/00037* (2013.01); *B65D 2543/0074* (2013.01); *B65D 2543/00092* (2013.01); *B65D 2543/00277* (2013.01); *B65D 2543/00296* (2013.01); *B65D 2543/00305* (2013.01); *B65D 2543/00527* (2013.01); *B65D 2543/00537* (2013.01); *B65D 2543/00629* (2013.01); *B65D 2543/00685* (2013.01); *B65D 2543/00814* (2013.01); *B65D 2543/00842* (2013.01); *B65D 2543/00962* (2013.01); *Y02A 40/962* (2018.01)

(58) Field of Classification Search
CPC ...... B65D 2543/00962; B65D 39/0041; B65D 47/12; B65D 51/245; B65D 1/12; B65D 41/16; B65D 43/0222; C12H 1/22; Y02A 40/962
USPC .... 99/277.1, 277.2, 376, 289 T; 220/DIG. 1, 220/200, 253, 360; 217/76, 81, 93, 105
See application file for complete search history.

(56) References Cited

U.S. PATENT DOCUMENTS

| | | | |
|---|---|---|---|
| 603,348 A | 5/1898 | Thompson | |
| 616,563 A | 12/1898 | Taylor | |
| 625,573 A | 5/1899 | Leavitt | |
| 886,981 A | 5/1908 | Hurst | |
| 923,461 A | 6/1909 | Strehli | |
| 1,133,688 A | 3/1915 | Wiedeman et al. | |
| 1,267,542 A | 5/1918 | Hanson | |
| 1,320,862 A | 11/1919 | Irey | |
| 2,010,109 A | 8/1935 | Rice | |
| 2,538,682 A * | 1/1951 | Gramelspacher | B65D 9/30 217/3 BC |
| 2,829,794 A | 4/1958 | Epps | |
| 2,952,377 A | 9/1960 | Brown et al. | |
| 3,064,849 A | 11/1962 | Ferm | |
| 3,815,774 A | 6/1974 | Olsson | |
| 3,912,110 A | 10/1975 | Hammes | |
| 6,401,957 B1 | 6/2002 | Przytulla | |
| 2006/0032858 A1* | 2/2006 | Lee | B65D 21/0219 220/793 |
| 2006/0037485 A1* | 2/2006 | Ho | A47J 43/24 99/495 |

FOREIGN PATENT DOCUMENTS

| | | |
|---|---|---|
| DE | 202006004354 U1 | 7/2007 |
| DE | 102007060725 A1 | 5/2009 |
| EP | 0761556 | 3/1997 |
| GB | 173333 | 1/1922 |
| GB | 454325 | 9/1936 |
| GB | 2526373 A | 11/2015 |
| WO | WO-2004/094237 A2 | 11/2004 |

* cited by examiner

DEVICE FOR CAPPING A BARREL

RELATED APPLICATIONS

This application claims the benefit of U.S. Provisional Patent Application No. 62/157,614 filed May 6, 2015, the entire contents of which are hereby incorporated by reference herein for all purposes.

TECHNICAL FIELD

The embodiments disclosed herein relate to liquid containers such as barrels, casks, and tuns. In particular, the embodiments disclosed herein relate to devices for capping barrels for aging liquids.

INTRODUCTION

The following paragraphs are not an admission that anything discussed in them is prior art or part of the knowledge of persons skilled in the art.

FIG. 1 illustrates a conventional barrel 10. The barrel 10, cask, or tun is a hollow cylindrical container, traditionally made of wooden staves 12 bound by wooden or metal hoops 14, 16, 18.

Traditionally, the barrel 10 is a standard size of measure referring to a set capacity or weight of a given commodity. Modern wooden barrels for wine-making may be made of French common oak, French white oak, or American white oak and have typically standard sizes: Bordeaux type (225 liters), Burgundy type (228 liters), and Cognac type (300 liters). Modern barrels and casks can also be made of aluminum, stainless steel, and different types of plastic. The barrel 10 may have a variety of uses, including storage of liquids such as water and oil, fermenting wine, arrack and sake, aging wine, distilled spirits such as whiskey, brandy, or rum, beer, tabasco sauce, or vinegar.

Liquids aged in the wooden barrels 10 take on some of the compounds in the barrel 10, such as vanillin and wood tannins. The presence of these compounds depends on factors, including the place of origin, how the staves 12 were cut and dried, and the degree of toast applied during manufacture. After roughly three years, most of the flavor compounds have been leached out.

The barrel 10 has a convex shape, bulging at the bilge 20 and includes head 22. The head 22 is a flat circular top 22 or bottom 24 of the barrel 10. The head 22 is surrounded by a raised end of the staves 12 to form a chime 26. The chime 26 is the rim or the utmost end of the barrel 10 and may have a beveled surface.

The hoops 14, 16, 18 hold the barrel 10 together and are generally made of galvanized iron, though they may be made from flexible bits of wood called withies. The barrel 10 includes head or chime hoops 14 nearest the head 22 of the barrel 10. Bilge hoops 18 are those nearest the bilge 20, while quarter hoops 16 are located between the head hoop 14 and the bilge hoops 18.

The barrel 10 may include a bunghole 28. The bunghole 28 is an opening bored in the barrel 10 to add or remove contents. The bunghole 28 may be in the head 22 of the barrel 10 or on the side of the barrel 10 in one of the staves 12. To close the barrel 10, the bunghole 28 is capped with a bung (not shown) which may be made of silicone, cork, or wood.

SUMMARY

According to some embodiments, there is a capped barrel system including a barrel for aging and a device for capping the barrel. The barrel includes a plurality of staves made of a wood suitable for aging liquids, a plurality of hoops for holding the staves together, a head having a flat circular top, a bunghole in the head, and a chime formed by raised ends of the staves. The device includes a lid sized to span across the head and beyond the chime, a flange extending downwardly from the lid for engaging an external side of the staves, an opening in the lid to generally align with the bunghole, and a closure sized to seal the opening.

In an embodiment, there is a cap for a wooden barrel for aging. The cap includes a lid sized to span across a head of the barrel and beyond a chime of the barrel, a flange extending downwardly from the lid for engaging an external side of the barrel, an opening in the lid to generally align with a bunghole of the barrel, and a closure sized to seal the opening.

In an aspect, the flange engages the external side of the barrel to secure the lid to the barrel.

In an aspect, the flange includes an attachment for attaching to an underside of a hoop.

In an aspect, the attachment includes a plurality of tabs spaced around the flange.

In an aspect, the hoop is a head hoop of the barrel.

In an aspect, the head is circular and the lid is disk-shaped.

In an aspect, the device further includes a spout extending downwardly from the opening and sized to be received by a bunghole of the barrel.

In an aspect, the spout is sized to receive a filling stem or a draining stem.

In an aspect, the cap further includes a seal between the lid and the chime to seal the barrel such that flow of fluid is inhibited.

In an aspect, the cap further includes a spacer for shimming the seal between the lid and the chime.

In an aspect, the closure includes an adhesive surface for adhering to the lid. In an aspect, the closure is removable. In an aspect, the closure is frangible. In an aspect, the closure includes printed identification information. In an aspect, when the closure is removed debris is inhibited from flowing into the opening.

In an aspect, the cap is made of a flexible and resilient plastic material.

In an aspect, the flange can be snap fitted onto the head of the barrel.

In an aspect, the lid includes a support surface for receiving a stacked barrel above.

In an aspect, the flange includes an extended tab having a surface for identification information.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below. It is possible that an apparatus or process described below is not covered by any of the claimed embodiments. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

Figure 1:
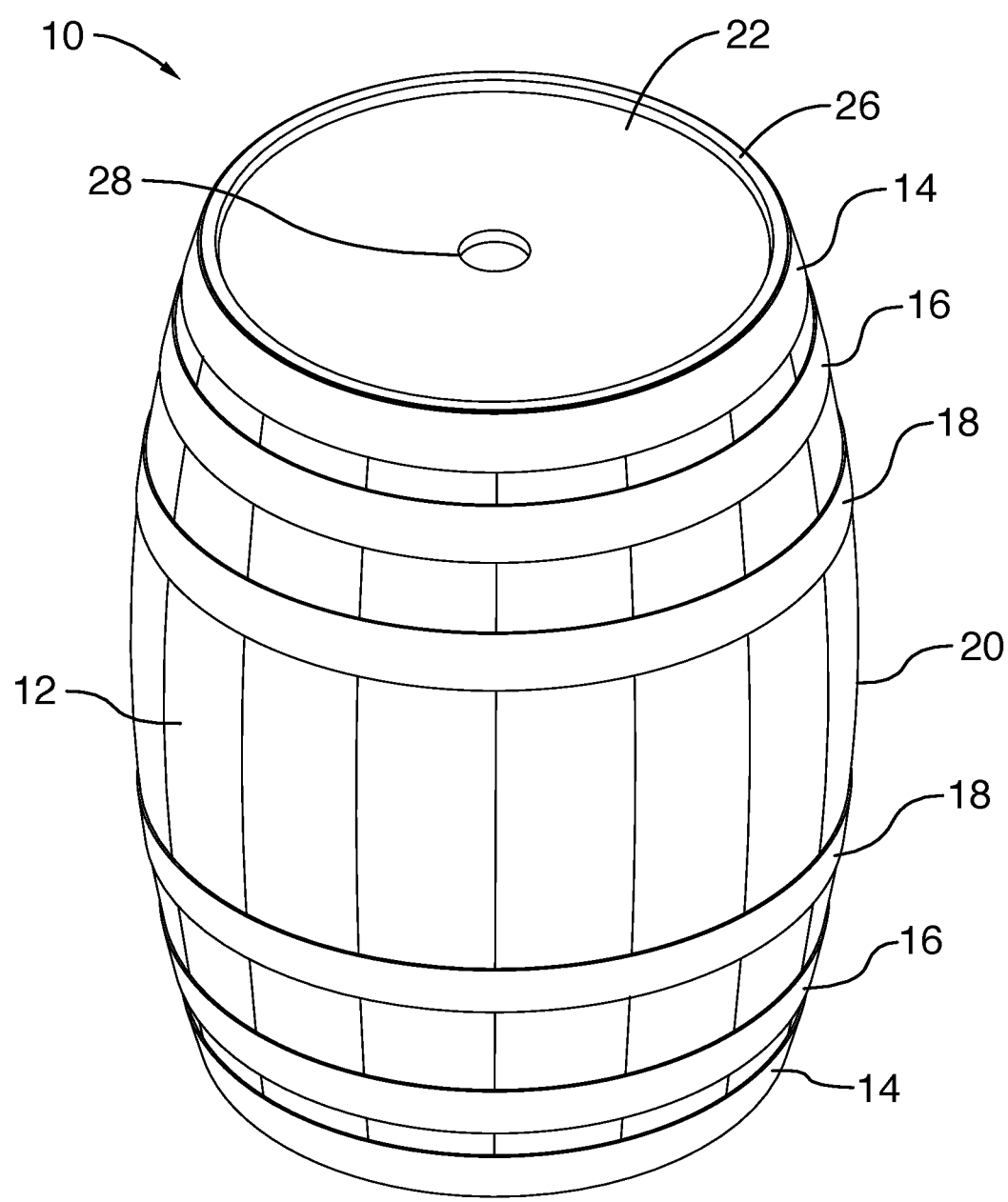
FIG. 1 is a perspective view of a barrel.
Figure 2:
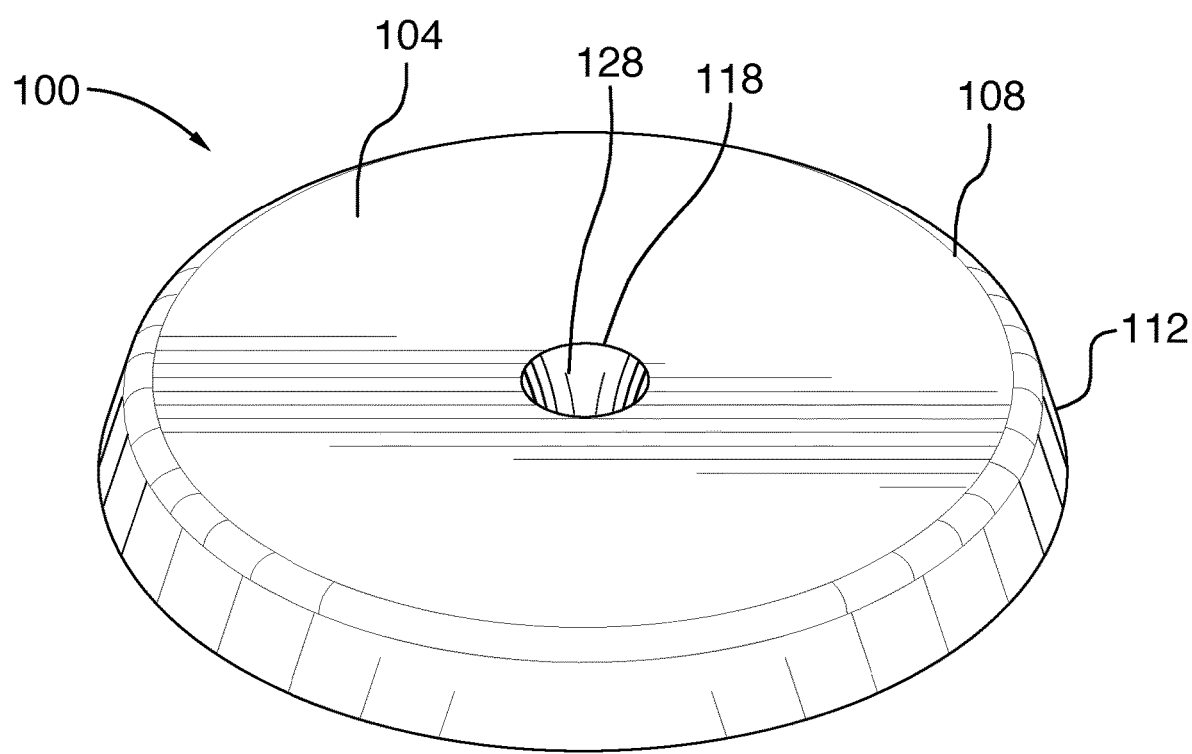
FIG. 2 is a perspective view of a device for capping a barrel, in accordance with and embodiment.
Figure 3A:
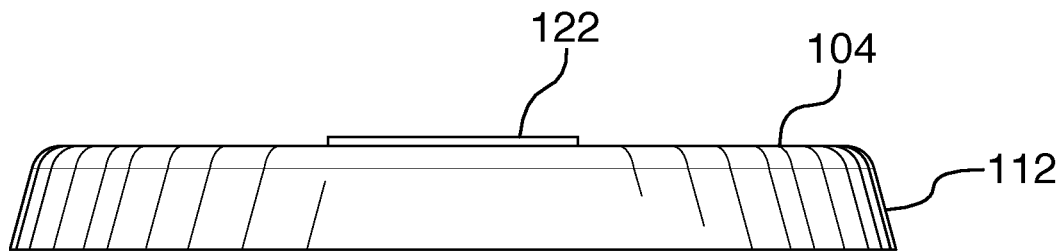
FIGS. 3A and 3B are side and top views, respectively, of the device of FIG. 2 having a closure.
Figure 3B:
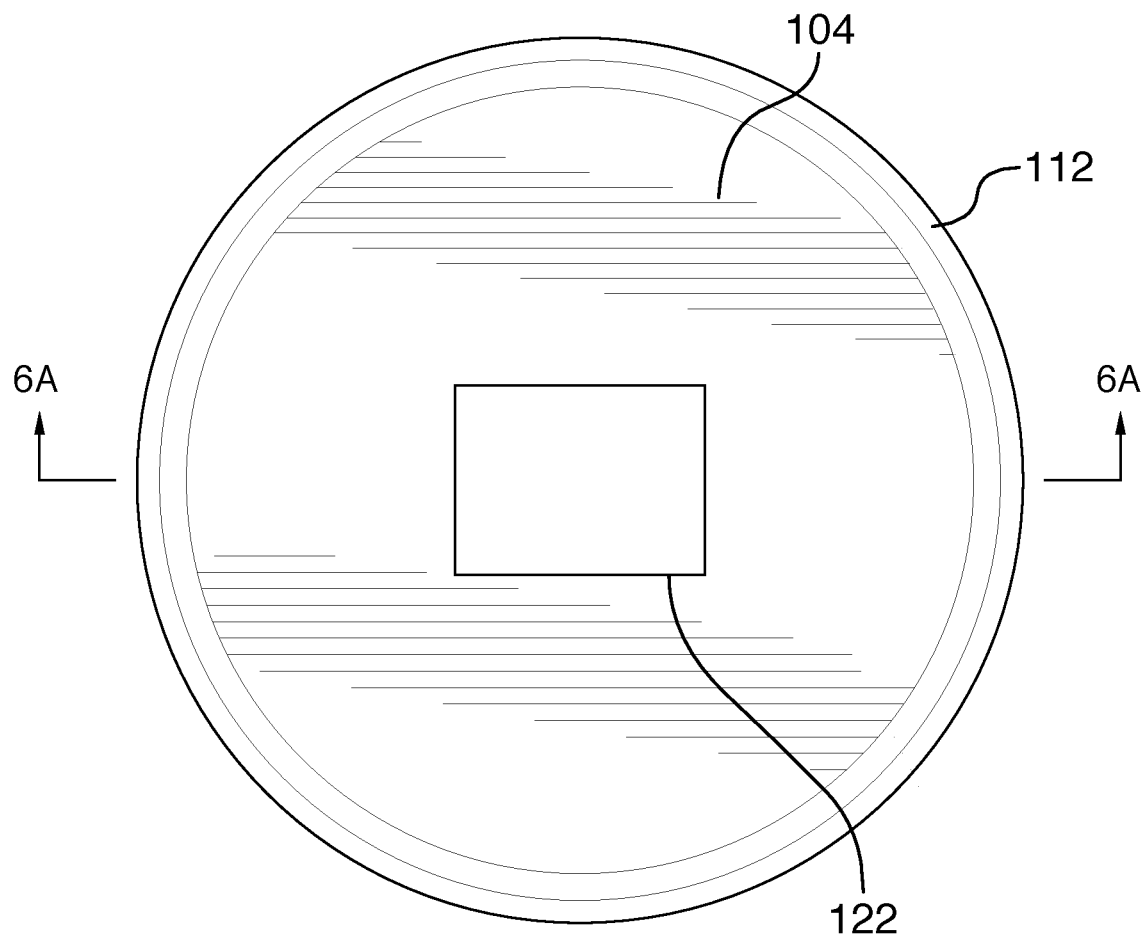

Referring again to FIG. 1, the barrel 10 may have the bunghole on the staves 12 and be stored on its side. More recently, the barrel 10 may be vertically stored on its end with the head 22 at the top. Traditionally, the storing of the barrel 10 on the ends was not common as the barrel 10 is easiest to move by hand when on its bilge 20. The bilge 20 may facilitate the rolling of the barrel 10 on its side which allows the barrel 10 to change directions with little friction, as compared to a cylinder.

With the move to vertical storage of the barrels, the bunghole 28 also moved to the head 22, as the barrel 10 is commonly filled in the same position as storage. After the barrel 10 has been filled, the bung closes the bunghole 28 and seals the barrel 10. The contents are then left to age for a period of time.

Over time, the bung and the head 22 may warp, crack, and become porous. When a wine or spirit ages in the barrel 10, small amounts of oxygen are introduced as the barrel 10 lets some air in. Oxygen enters the barrel 10 when water or alcohol is lost due to evaporation, a portion known as the angels' share. In some cases, beverages may be topped up from other barrels 10 to prevent significant oxidation. These losses can account for about 10% in the first year, to about 3% in subsequent years for the volume of the aged spirits produced. There may be a desire to reduce the amount of spirit loss in a cost effective manner.

Further, during storage the barrel 10 may be stacked on pallets. For example, a pallet of six barrels may be organized with a width of three barrels by two barrels deep. This pallet of six barrels is then stacked upon another pallet with the aid of, for example, a forklift. Where there are two or more pallets stacked on top of each other, shims (not shown) for example, of wood, may be used to provide a level surface to accommodate and support the stacked pallet.

Further, the shims used to support stacked barrels can break and splinter during ageing, during storage, or during transport and end up on the head 22. Other dust and debris can accumulate on the head 22, especially where the barrel 10 is stored outside, as may be the case for empty barrels. When storing the barrel 10 outside, rainwater, ice, and snow may collect on the barrel head 22. This, along with varying temperatures can cause the head 22 to crack and head bungs to loosen. While stored outside, these liquids can enter the barrel 10 and cause contamination to the product. Further, standing liquid that rests on top of the barrel can enter the barrel 10 when the head bung is removed.

Previously used barrels may have had several coats of paint applied on the head 22 which was used to cover the previous branding (e.g. batch number, date, product reference, etc.) and provided a clean surface to apply a new brand. Over years of storage the paint may begin to peel, crack, and chip. This paint may collect on the head 22 and may enter the barrel 10.

Once the contents have been aged, the bung is removed from the bunghole 28 or a new bunghole is bored and the contents are removed using a suction or vacuum draining stem. Product remaining in the drain stem can leak out onto the head 22 after each production cycle, which may result in debris that rests on the head 22 to enter the barrel 10.

At this time, any debris, dust or dirt that has accumulated on the head 22 and below the chime 26, during aging, may enter through the bunghole 28 and contaminate or reduce the quality of the contents. The debris on the head may also be sucked up by the draining stem and contaminate the contents. Because of the construction of the barrel 10, there is this recessed layer that may, during storage, accumulate and catch debris which would not as easily occur if the barrel 10 is stored on its side.

Once the barrel 10 has been used in one application, for example aging wine, the barrel 10 may be reused to age spirits, such as whiskey or rum, as the flavor from the first application leaches into pores of the barrel 10. Then on the second application, the flavors of the first application will leach out into the second application providing a desirable flavor, as is known in the art. For this reason, the barrel 10 may be reused on multiple occasions affecting the durability of barrel 10, the bung, and may lead to the head 22 accumulating debris.

Recycled barrels may also become damaged, cracked, or warped, especially on the head 22, for example caused by the vapors accumulating under the head 22. In some cases, the head 22 may be so damaged that the barrel 10 cannot be used, as severe contamination or evaporation may occur. While damaged heads 22 may be repaired using joiner pegs (not shown), the joiner pegs may cause further contamination or damage. Conventionally, damaged barrel heads may be replaced by an entirely new barrel head which may be prohibitively expensive at which point the barrel 10 is decommissioned.

When it comes time to fill or refill the empty barrel 10, one that has been in storage, a nozzle is inserted into the bunghole 28 and the fluid fills the barrel 10. On occasion, there is an over fill or spillage onto the head 22, and any dirt or debris will flow into the fluid and undesirably degrade the quality or even spoil the batch causing wasted product.

Due to labeling requirements, identification information such as serial number, lot, contents, and date of the barrel 10 may be stamped into the head 22 of the barrel or on the bung in the head 22. However, stacking the barrel 10 vertically obscures the head 22, and without removing the upper barrel, the identification of the barrel 10 cannot be ascertained. Often, the barrel is permanently stamped, etched or burned in, which may not provide opportunity to reuse and re-label the barrel 10 as may be desired. Further, some heads 22 may be painted over to conceal information applied to the head 22.

Referring to FIGS. 2 through 7, illustrated therein is a cap or device 100 for capping a barrel 102 for aging (e.g. barrel 10 of FIG. 1), in accordance with an embodiment. The barrel 102 may have wooden staves 110 for aging of spirits, as generally described with respect to FIG. 1. The device 100 and the barrel 102 may form a capping system, in accordance with an embodiment. The device 100 may aid in the draining of matured spirits and well as aiding in the filling of spirits.

The device 100 includes a lid 104 for covering the head 106 of the barrel 102. The lid 104 is sized to span across the head 106 of the barrel 102. The lid 104 extends beyond a chime 126 of the head 106 and over the top of the staves 110. Where the head 106 is circular, the lid 104 may be disk-shaped.

The lid 104 may act as an additional head of the barrel 102 to protect the existing head 106 of the barrel. The lid 104 may prevent the accumulation of dust and debris in the area above the head 106 and below the chime 126. The lid 104 has an upper surface 134 that is shaped to resist the accumulation of debris. In certain embodiments, the lid 104 is convex or cambered such that the center of the lid 104 is raised with respect to the perimeter 108 of the lid 104 which may allow for any dust or debris to slide off of the lid 104. The lid 104 may be used where the head 106 is damaged without having to replace the existing head 106. In an embodiment, the device 100 may be used without the head 106, for example, where the barrel 102 has an opened top end.

The lid 104 may include the upper surface 134 for receiving and supporting a second stacked pallet above. Specifically, the bottom of the pallet is supported by the upper surface 134 of the lid 104. The device 100 may therefor enable the stacking of additional pallets without the use of shims and thus eliminates the accumulation of splintered shims on the head 106. Further, the removal of conventional shims from the barrel 102 may cause the barrel 102 to be knocked over, thus reducing the use of conventional shims may be advantageous.

The device 100 also includes a flange 112 extending downwardly from the perimeter 108 of the lid 104. The flange 112 engages an external side of the barrel 102 to secure the lid 104 to the barrel 102. The flange 112 may contact a hoop 116a of the barrel 102. The flange 112 may be positioned surrounding the perimeter 108 of the lid 104. Alternatively, the flange 112 may be selectively positioned around the perimeter 108 of the lid 104 in order to provide the desired friction fit with the hoop 116a.

Figure 4:
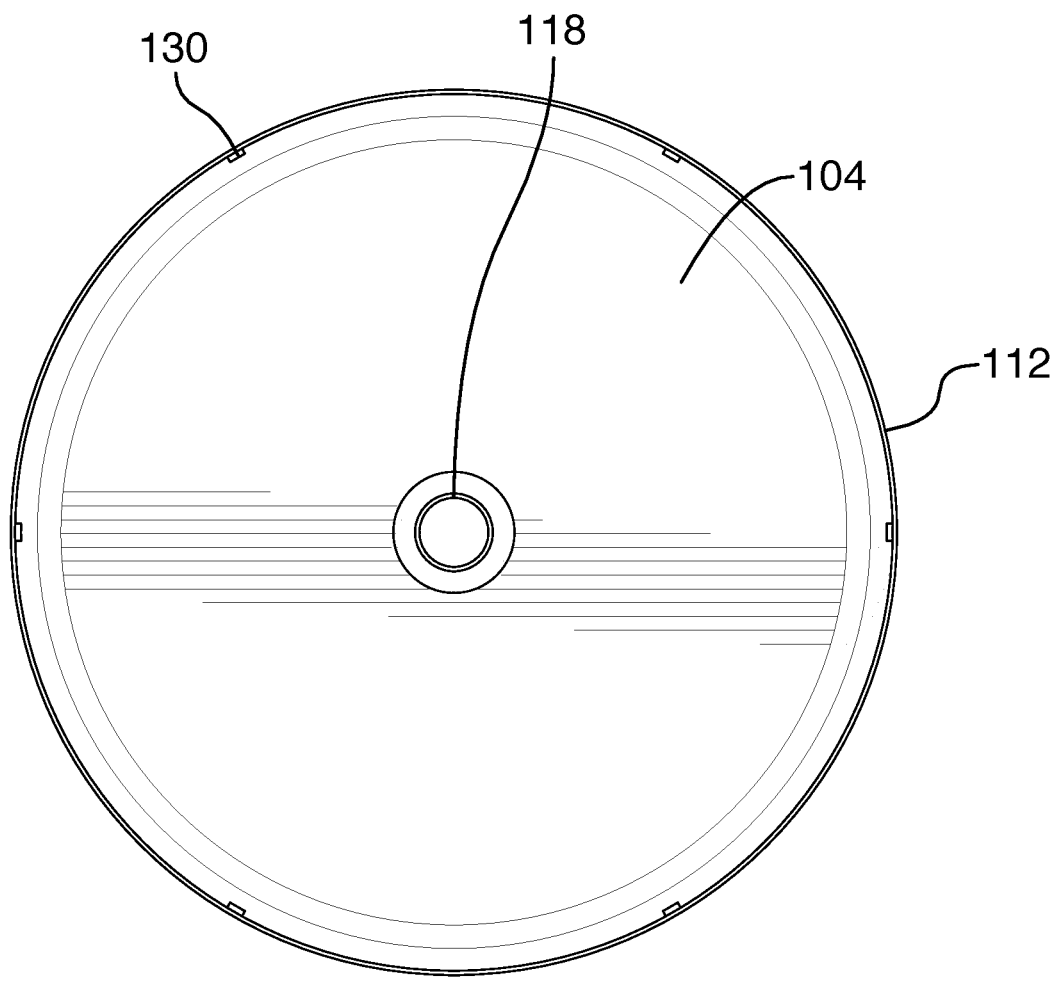
FIG. 4 is a bottom view of the device of FIG. 2.
Figure 5:
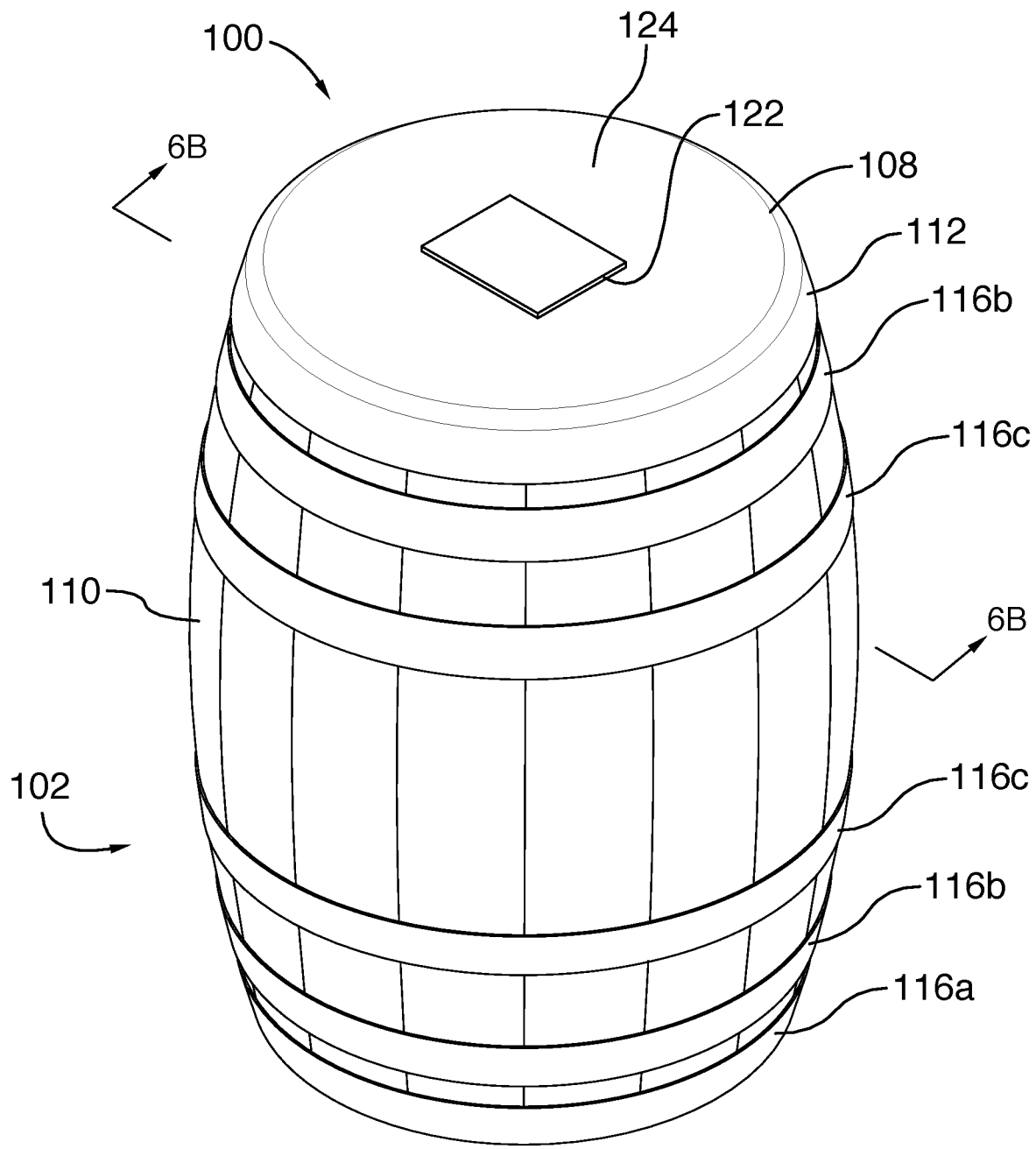
FIG. 5 is a perspective view of the device of FIG. 2 having a closure in use with a barrel, in accordance with an embodiment.
Figure 6A:
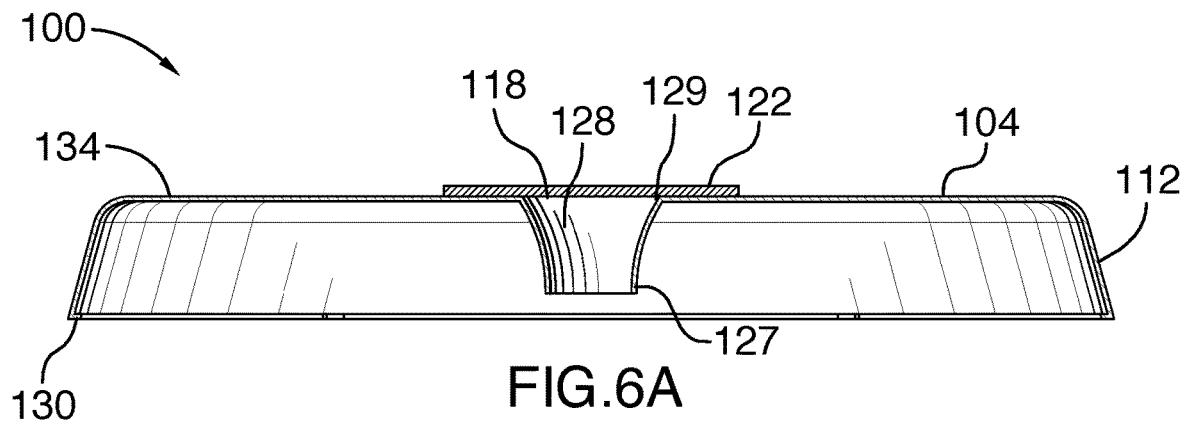
FIG. 6A is a cross-sectional view of the device taken along line 6A-6A of FIG. 3B.
Figure 6B:
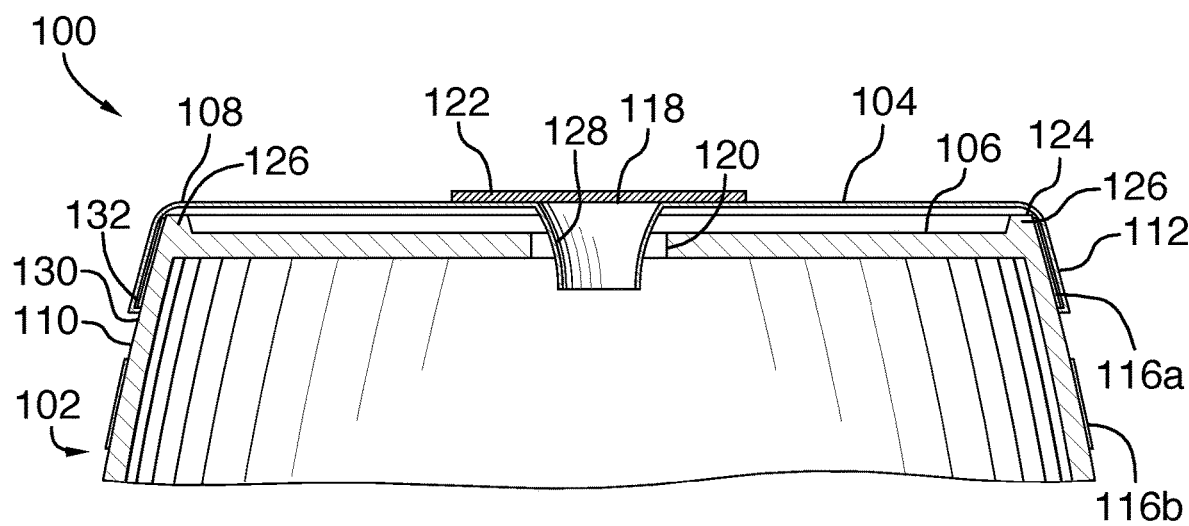
FIG. 6B is a cross-sectional view of the device in use with a barrel taken along line 6B-6B of FIG. 5.

The flange 112 may include an attachment 130 for attaching to an underside 132 of the hoop 116a. Advantageously, where the barrel 102 is of a standard shape and size, the hoop 116a is at a consistent distance from the chime 126. The hoop 116a may be a head hoop 116a of the barrel 102. The attachment 130 may be a plurality of tabs, as illustrated in FIG. 4. Alternatively, the attachment 130 may be a rim or a lip that extends the circumference of the flange 112 which matingly engages around the perimeter with the underside 132 of the hoop 116a. In certain embodiments, the flange 112 may extend to other hoops, such as the quarter hoop 116b or the bilge hoop 116c, depending on the desired flange length.

In an alternative embodiment, where there is a second barrel or pallet stacked above the device 100, the weight of the second barrel may reduce the need to have the attachment 130.

The device 100 includes an opening 118 aligning generally with a bunghole 120 of the barrel 102. The opening 118 may generally be in the center of the lid 104. The opening 118 may allow for the filling and emptying of the barrel 102. In this respect, the opening 118 is sized to fit a filling stem and a draining stem. For example the opening 118 may be about 2½ inches to 2 and 11/16 inches to accommodate a filling or draining stem of 2 inches.

In an embodiment, the device 100 may include a spout 128 at the opening 118. The spout 128 extends downwardly from the edge of the lid 104 and is sized to be received by the bunghole 120 of the barrel. The spout 128 may extend beyond the head 22 into the barrel. In this way, when the barrel 102 is filled by the filling stem, the fluid is funneled directly into the barrel 102, without fluid being directed onto the head 106 of the barrel 102. The spout 128 may guide the filling or draining stem into the bunghole 120.

In an alternative embodiment, the device 100 includes a truncated spout (not shown) that does not enter the bunghole 120. Rather, where there is an existing bung (not shown) in the bunghole 120, the truncated spout stops above the surface of the head 22 at the bunghole 120 to accommodate the bung.

The spout 128 may be a frustoconical shape such that a distal end 127 of the spout 128 has a smaller size or diameter then that of the upper, proximal end 129. As such, where the location of the bunghole 120 is not directly centered in the head 106 of the barrel 102, the frustoconical shape of the spout 128 allows for this variance due to the location of the bunghole 120. In an embodiment, the spout 128 is frustoconical and has a beveled surface transitioning into the lid 104. In an embodiment, the diameter of the distal end 127 of the spout 128 is less than the diameter of the bunghole 120 and greater than the diameter of the filling or draining stems.

As shown in FIGS. 3A, 3B, 5, 6A, and 6B, the device 100 includes a closure 122 sized to seal and cover the opening 118 in the lid 104. The closure 122 may be air tight to seal the contents of the barrel 102. As such, the closure 122 may eliminate the need for a bung to close the barrel 102. Thus the closure 122 may reduce the angles' share.

In certain embodiments, the closure 122 has an adhesive on its lower surface to adhere to the lid 104. The closure 122 may be made of a vinyl material.

The closure 122 may be frangible such that when filing or emptying the barrel 102, the filling or draining stem may destructively puncture the closure 122 and pass through the opening 118 to fill or drain the barrel 102 with liquid. When the device 100 is re-used a new closure 122 may be placed over an old one.

In further embodiments, the closure 122 includes information which may be preprinted directly onto the closure 122. The identification information may describe the contents of the barrel 102, such as the type of liquid, the date, the serial number, the lot number, the manufacturing date, the maturity date, quality control data, and the like and as may be required by law or regulation. The closure 122 may also withstand the force of the liquid contents, for example when the barrel 102 is rolled onto the bilge (e.g. bilge 20 of FIG. 1).

The closure 122 may also be tamper proof, such that if the contents of the barrel 102 have been or have been attempted to be tampered with by a user, the closure 122 may be destructively altered such that there is evidence of the tampering. In a further embodiment, the closure 122 is removable. The closure 122 may include a removable adhesive that allows for easy removal when the device 100 is to be reused.

The lid 104 of the device 100 may shaped such that when the closure 122 is removed, debris and dust located on the lid 104 does not flow or drain into the opening 118 thereby reducing contamination of the contents of the barrel 102. The device 100 may also prevent dust and debris from entering the barrel 102 when empty barrels are stored for further use.

The device 100 may include a gasket or seal 124 between the lid 104 and the chime 126 to seal the barrel 102 such that inflow or outflow of fluid (including liquid and/or gas) is inhibited between the device 100 and the chime 126. Thus the seal 124 may reduce the angles' share. The seal 124 may be a separate lining on the underside perimeter of the lid 104. The seal 124 may be further created from the weight of a second barrel stacked above.

Figure 7:
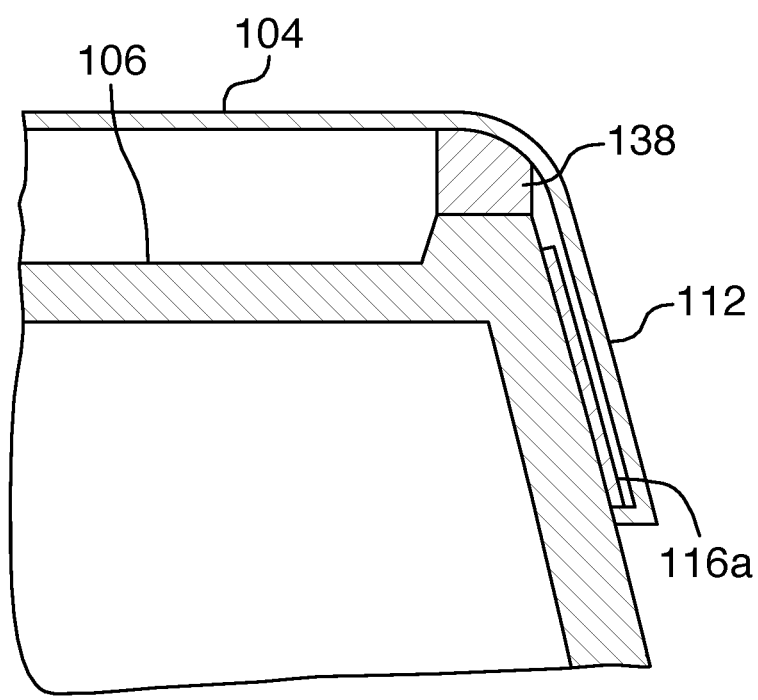
FIG. 7 is a cross-sectional view of the device in use with a barrel and having a spacer, in accordance with a further embodiment.

In an embodiment, as shown in FIG. 7, The device 100 may include spacers 138 for shimming the seal space between the lid 104 and the chime 126. The spacers 138 may be made of food grade material. The spacers 138 may be of varying thickness to accommodate for varying distances from the chime 126 to the underside 132 of the hoop 116a while still providing an appropriate attachment and seal. The spacers 138 may also level barrels on a pallet, thereby facilitating stacking of barrels of various heights while maintaining the seal.

Spacers 138 of various thickness can be stacked one or more on top of each other. Where the barrel 102 is shorter than adjacent barrels, the spacers 138 can level off the barrel 102 to the same height of the tallest of the barrels on the pallet, which may eliminate the use of wooden shims. Further, when the spacers 138 remain after each drain and fill cycle, unlike wooden shims that have to be removed and reapplied after each subsequent use, the pallet of barrels may only need to be leveled off once. In this case, the flange 112 may be lengthened to accommodate varying sizes of barrels 102 and spacers 138.

The device 100 may be a one piece construction. The device 100 may be made of a flexible and resilient plastic material such that the device 100 can be snap fitted onto the head of the barrel 102. For example, the device 100 is made of as high-density polyethylene (HDPE) or a high resiliency rubber or foam. In a further embodiment, the device 100 is made of a cork material. In an embodiment, the lid 104 and the flange 112 is made of a stainless steel material.

The device 100 may provide production efficiencies related to cost savings for barrel loss, quality improvements, ease of production process, cost reduced and more efficient product identification, as well as decreased product loss due to evaporation.

Figure 8A:
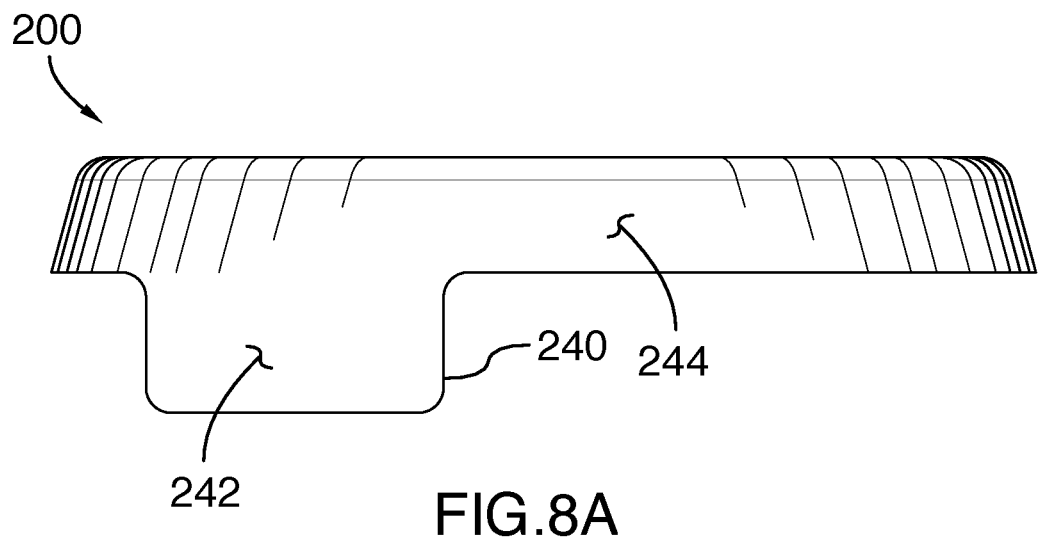
FIGS. 8A and 8B are side and perspective views, respectively, of a device for capping a barrel and having an extended flange, in accordance with a further embodiment.
Figure 8B:
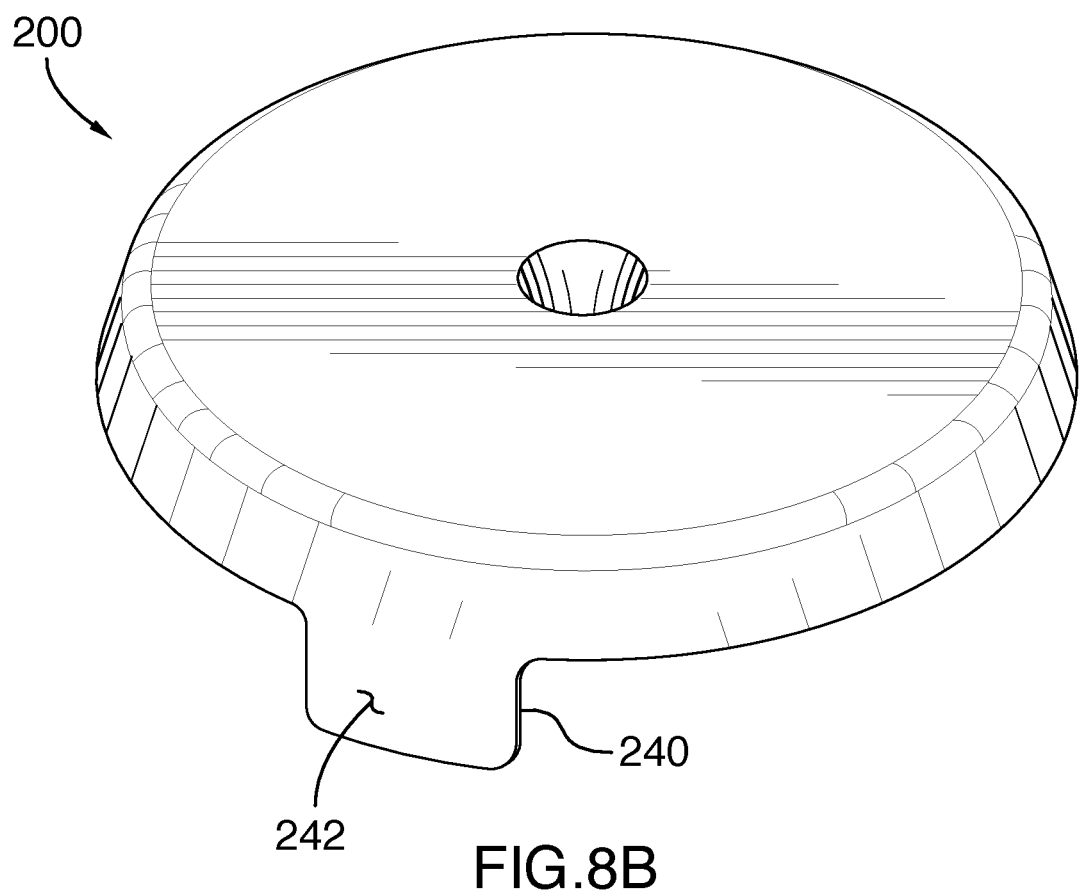

FIGS. 8A and 8B show a device 200 in accordance with a further embodiment. The device 200 is generally similar to the device 100 as described with reference to FIGS. 2-6B except that the flange 112 includes an extended tab 240 for providing an identification surface 242 on a side of the barrel 102. The identification surface 242 provides an area for adhering identification information relating to the contents of the barrel such as those mentioned above as well as warning labels and the like. In this embodiment, the identification information may be viewed by a user from the side of the barrel, when the barrels are stacked vertically.

The flange extension 240 may be used for warning labels as may be required by government regulations. In this case, the identification information may contain a bar code, 2D code, lot number, batch number and the like and may be printed on a smaller label surface 244 applied to the flange 112 which may be visible without de-stacking palatalized barrels. The identification information may be the same information as printed on the closure 122.

While the above description provides examples of one or more apparatus, methods, or systems, it will be appreciated that other apparatus, methods, or systems may be within the scope of the claims as interpreted by one of skill in the art.

What is claimed is:

1. A capped barrel system comprising:
   a barrel for aging, the barrel including: a plurality of staves made of a wood suitable for aging liquids, a plurality of hoops for holding the staves together, a head having a flat circular top, a bunghole in the head, and a chime formed by raised ends of the staves; and
   a device for capping the barrel, the device including:
      a lid sized to span across the head and beyond the chime, the lid and the chime cooperating to provide a gas tight seal to the barrel,
      a flange extending downwardly from the lid for engaging an external side of the staves,
      an opening in the lid to generally align with the bunghole,
      a spout extending downwardly from the opening, the spout extending below the gas tight seal at the chime of the barrel and beyond the head through the bunghole and into the barrel,
      and a closure sized to seal the opening.

2. The capped barrel system of claim 1, wherein the flange engages the external side of the barrel to secure the lid to the barrel.

3. The capped barrel system of claim 1, wherein the flange includes an attachment for attaching to an underside of a hoop.

4. The capped barrel system of claim 3, wherein the attachment includes a plurality of tabs spaced around the flange.

5. The capped barrel system of claim 3, wherein the attachment of the flange is sized and shaped to attach to the underside of a head hoop of the barrel.

6. The capped barrel system of claim 1, wherein the lid of the cap is disk-shaped.

7. The capped barrel system of claim 1, wherein the spout is sized to receive a filling stem or a draining stem.

8. The capped barrel system of claim 1 further comprising:
   a spacer for shimming the gas tight seal between the lid and the chime.

9. The capped barrel system of claim 1, wherein the closure includes an adhesive surface for adhering to the lid.

10. The capped barrel system of claim 1, wherein the closure is removable.

11. The capped barrel system of claim 1, wherein the closure is frangible.

12. The capped barrel system of claim 1, wherein the cap is made of a flexible and resilient plastic material.

13. The capped barrel system of claim 1, wherein the flange can be snap fitted onto the head of the barrel.

14. The capped barrel system of claim 1, wherein the lid includes a support surface for receiving a stacked pallet above.

15. A capped barrel system comprising:
   a barrel for aging, the barrel including: a plurality of staves made of a wood suitable for aging liquids, a plurality of hoops for holding the staves together, a head having a flat circular top, and a bunghole in the head; and a device for capping the barrel, the device and the staves cooperating to provide a gas tight seal to the barrel, the device including:
  a lid sized to span across the head and beyond the chime,
  a flange extending downwardly from the lid for engaging an external side of the staves,
  a spout defining an opening in the lid that is generally aligned with the bunghole, and,
  a closure sized to seal the opening.

16. The capped barrel system of claim 15, wherein the cap is made of a flexible and resilient material.

17. The capped barrel system of claim 15, wherein the closure is removable.

18. A capped barrel system comprising:
a barrel for aging, the barrel including: a plurality of staves made of a wood suitable for aging liquids, a plurality of hoops for holding the staves together, a head having a flat circular top, a bunghole in the head; and
a device for capping the barrel including:
  a lid sized to span across the head,
  a flange extending downwardly from the lid and cooperating with the staves to provide a gas tight seal to the barrel,
  a spout defining an opening in the lid that is generally aligned with the bunghole, and,
  a closure sized to seal the opening.

19. The capped barrel system of claim 18, wherein the cap is made of a flexible and resilient material.

20. The capped barrel system of claim 18, wherein the closure is removable.

* * * * *